Oct. 11, 1927.  1,644,893

K. E. PEILER

FEEDING MOLTEN GLASS

Filed Sept. 1, 1925

INVENTOR
KARL E PEILER
ATTORNEY

Patented Oct. 11, 1927.

1,644,893

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

FEEDING MOLTEN GLASS.

Application filed September 1, 1925. Serial No. 53,871.

My invention relates to the art of feeding molten glass, and particularly to the heating of glass-feeding forehearths and other similar containers for molten glass.

The object of my invention is to provide a method and apparatus for uniformly heating the interior of glass-feeding forehearths and for accurately controlling the temperatures in the various portions thereof.

More specifically my invention provides for uniformly heating glass discharge chambers of the type in which a rigid flow-controlling member forms an obstruction to the effective circulation of the heating medium in the chamber, and, therefore, tends to produce uneven temperatures therein.

One type of glass feeder which is now in extensive commercial use is composed of a conduit or forehearth which ordinarily communicates with the interior of a melting tank furnace, and the forward end of this forehearth terminates in a discharge chamber or spout which is provided with a submerged outlet for the discharge of the molten glass. A vertical implement is mounted in the discharge chamber above the outlet, for the purpose of controlling the discharge of glass, and this implement is surrounded by a vertically adjustable tube which cooperates with the implement in producing proper discharges of the glass. The forehearth and the spout are ordinarily heated from the rear or furnace side of the forehearth, and with the heating arrangements which have heretofore been employed, it has been found that the tube, or the implement if no tube is used, tends to shade the front portion of the spout from the heat rays, thereby causing a cool streak or "cold shadow" in the glass discharged from the outlet.

According to my present invention, I avoid this streaking or cold shadow effect by insuring that the flame which heats the forehearth and the spout shall circulate uniformly along the walls thereof and around the flow-controlling implement. I have discovered that by maintaining the heating flame constantly at one side only of the flow-controlling implement and substantially parallel to the side walls of the forehearth, the flame traverses the side walls of the forehearth and sweeps around the forward portion of the forehearth, thereby heating the glass in that region sufficiently to prevent the uneven temperature conditions mentioned above. After passing around the front of the discharge chamber, the hot gases from the heating flame are preferably caused to move to the rear in contact with the surface of the glass, and thence out through a suitable stack.

Figure 1:
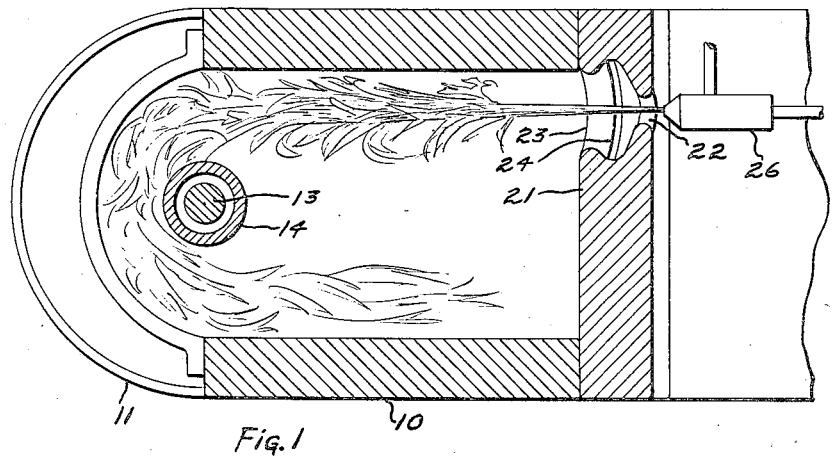
Figure 1 is a horizontal sectional view, taken on the line 1—1 of Fig. 2, and shows a glass feeder embodying a heating means constructed in accordance with my invention.
Figure 2:
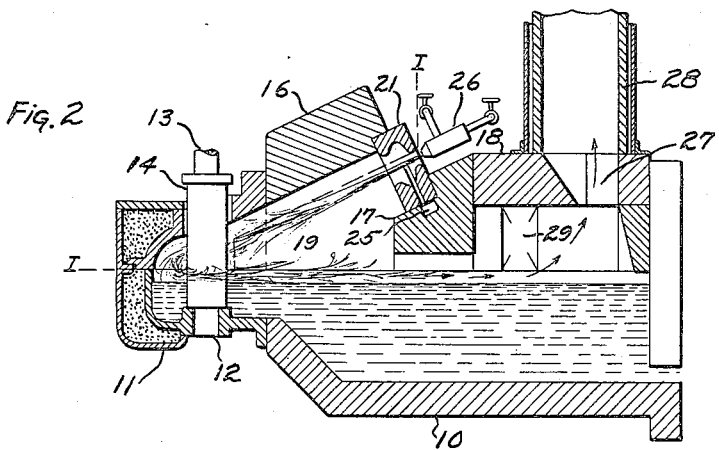
Fig. 2 is a longitudinal sectional view taken centrally through the structure shown in Fig. 1.

In Figs. 1 and 2 of the drawing, the numeral 10, indicates a conduit or forehearth, the interior of which communicates with a glass melting tank, not shown. At the front of the forehearth 10 is a discharge chamber or spout 11 which has a downwardly opening discharge outlet 12 above which is mounted a vertically reciprocable impeller 13 enclosed within a tube 14. The supports for the forehearth and the supporting and operating means for the impeller and the tube are of constructions well understood by those skilled in the art and are, therefore, omitted from the drawings.

The forehearth 10 is covered by refractory blocks 16, 17 and 18, the blocks 16 and 17 being so shaped and mounted as to provide a passage 19 that is inclined downwardly and forwardly toward the spout 11. At the rear of this passage is mounted a burner block 21 having, at one side of the center line of the feeder, a burner opening 22, a large mixing cavity 23 and a slot 24 communicating with an air port 25.

A burner 26 is arranged to direct its flame through the opening 22 in the burner block 21. As shown in Fig. 1 of the drawing, the burner 26 directs its flame through the channel 19 in a direction which may be substantially parallel and relatively close to the adjacent side wall of the forehearth, so that the flames thus directed follow the path indicated in Figs. 1 and 2, first traversing one side wall of the forehearth, then sweeping between the forward portion of the spout and the flow-controlling implement, then returning to the rear of the forehearth along the surface of the glass, and finally escaping through an opening 27 in the cover block 18 and through a stack 28 which should be provided with suitable damper arrangements for assisting in controlling the rate of movement of the burner gases. To further aid in controlling the temperature in the forehearth, an air port 29 is provided near the mid portion of the forehearth for introducing cooling air when desired.

Figure 3:
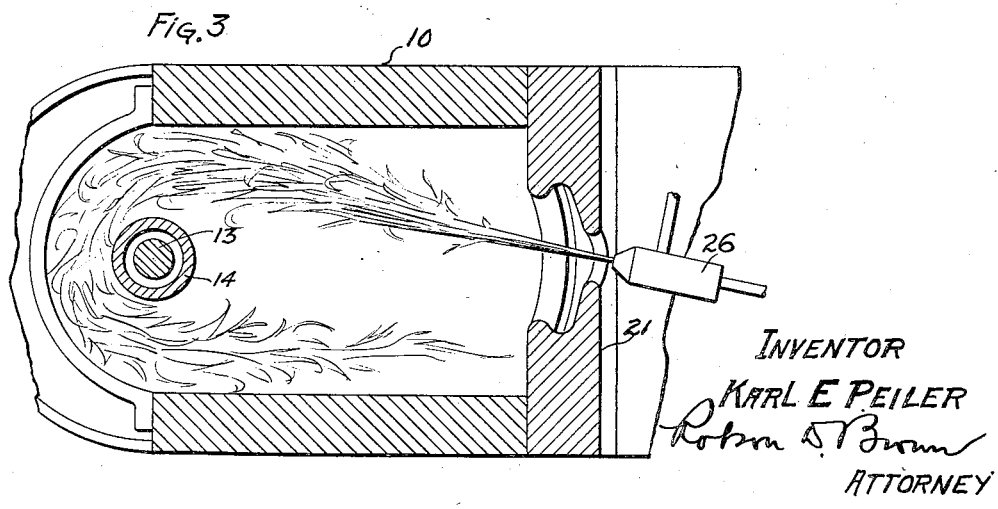
Fig. 3 is a horizontal sectional view showing a modification of the arrangement of the burner shown in Fig. 1.

Fig. 3 shows a modified construction in which the burner, here indicated by the numeral 29, is mounted to direct its flame diagonally across the forehearth chamber from a point either on the center line of the feeder chamber, as shown, or from a point still further removed from the wall of the forehearth toward which the burner initially directs its flame. This arrangement, while effective in heating the forehearth uniformly, has been found to give no particular advantage over the parallel burner arrangement shown in Fig. 1.

In both of the structures shown the spout and the forward chamber of the forehearth are heated uniformly by reason of the sweeping effect of the heating flames described above, and also because, as the flames move to the rear in contact with the surface of the glass and so tend to become cooler, heat is progressively added to these flames and to the glass by direct radiation from the hotter flames emitted from the burner. This method of producing uniform temperature in a glass feeding forehearth has been termed the "horseshoe flame" method, and is described and claimed in my copending application for Letters Patent, Serial No. 683,576, filed December 31, 1923.

I claim as my invention:

1. In heating the discharge chamber of a glass feeder having parallel side walls, a curved portion connecting the side walls and a vertical flow-controlling implement forming a heat obstruction in the forward portion of the chamber, the method that comprises projecting a heating flame forward and downwardly along a side wall of said chamber and to one side of the obstruction, circulating the flame around the forward portion of the obstruction and the curved walls and causing the flame to return to the rear of the chamber in contact with the glass.

2. In heating the discharge chamber of a glass feeder having substantially parallel side walls, a curved front portion connecting the side walls and a substantially vertical flow-controlling implement spaced from the side walls and front portion and forming a heat obstruction in the forward portion of the chamber, the method that comprises projecting a heating flame forward and downward along one side wall only of said chamber, then circulating said flame around the forward portion of the obstruction and the curved portion, and then causing said flame to pass substantially horizontally and in contact with the surface of the glass to the rear of said chamber.

3. Apparatus for feeding molten glass, comprising a container having substantially parallel side walls and a curved end portion connecting the walls, means for directing a heating flame forward and downwardly along one side wall to the curved portion of said container, and means for causing the flame to traverse said curved portion and return to the rear of the container along the opposite wall and in contact with the glass.

4. Apparatus for feeding molten glass, comprising a container having substantially parallel side walls and a curved wall closing the forward end portion of said container, a vertical flow-controlling implement located in the forward portion of the container and spaced from the side walls and said curved portion, means for directing a heating flame forwardly and downwardly along a side wall of the container and between the implement and the curved portion of said container, and means for causing the flame to pass around the flow-controlling implement and return to the rear of the container along the opposite wall and in contact with the glass.

5. Apparatus for feeding molten glass, comprising a forehearth, a discharge spout at the forward end of said forehearth, said spout being provided with a submerged outlet, a vertical flow-controlling implement extending through the spout toward the outlet, a burner located rearwardly of the spout and adapted to project a heating flame along a wall of the forehearth forwardly and downwardly to the discharge spout, and means for drawing the flame around the forward portion of the flow-controlling implement and rearwardly along the opposite wall of the forehearth and in contact with the surface of the glass.

6. Apparatus for feeding molten glass comprising a forehearth, a discharge spout at the forward end of said forehearth, said spout being provided with an outlet, a flow controlling implement extending through the spout toward the outlet, means for heating the forehearth and spout, comprising a single burner located rearwardly of the spout and adapted to project a flame along one wall of the forehearth forwardly and downwardly to the discharge spout, and means including a restricted passage over the glass at the rear of said forehearth for drawing the flame around the forward portion of the flow controlling implement and rearwardly along the opposite wall of the forehearth and in contact with the surface of the glass.

Signed at Hartford, Connecticut, this 27th day of August, 1925.

KARL E. PEILER.